(12) United States Patent
Flodin et al.

(10) Patent No.: US 11,368,354 B2
(45) Date of Patent: *Jun. 21, 2022

(54) MULTI-RESULT LOOKUPS

(71) Applicant: Arista Networks, Inc., Santa Clara, CA (US)

(72) Inventors: Hans Jonas Flodin, New Westminster (CA); Michael Chih-Yen Wang, Vancouver (CA); Peter Lam, Anmore (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,976

(22) Filed: Jul. 16, 2021

(65) Prior Publication Data

US 2021/0344550 A1  Nov. 4, 2021

Related U.S. Application Data

(63) Continuation of application No. 16/377,151, filed on Apr. 5, 2019, now Pat. No. 11,095,495.

(51) Int. Cl.
*H04L 12/24* (2006.01)
*H04L 41/02* (2022.01)
*H04L 41/0853* (2022.01)
*H04L 41/0866* (2022.01)
*G06F 16/22* (2019.01)
*H04L 41/00* (2022.01)
(Continued)

(52) U.S. Cl.
CPC ........ *H04L 41/024* (2013.01); *G06F 16/2228* (2019.01); *G06F 16/23* (2019.01); *H04L 41/0856* (2013.01); *H04L 41/0866* (2013.01); *H04L 41/12* (2013.01); *H04L 41/20* (2013.01); *H04L 41/24* (2013.01)

(58) Field of Classification Search
CPC .............. H04L 41/024; H04L 41/0856; H04L 41/0866; H04L 41/12; H04L 41/20; H04L 41/24; H04L 41/0823; H04L 41/0873; G06F 16/2228; G06F 16/23
See application file for complete search history.

(56) References Cited

U.S. PATENT DOCUMENTS 10,027,587 B1 * 7/2018 O'Brien ................. H04L 69/22
10,230,639 B1 * 3/2019 Patil ..................... G06F 16/2246
(Continued)

*Primary Examiner* — Gil H. Lee
*Assistant Examiner* — Juan C Turriate Gastulo
(74) *Attorney, Agent, or Firm* — Chamberlain, Hrdlicka, White, Williams & Aughtry

(57) ABSTRACT

A method for network hardware table management includes: obtaining, by a network device table manager of a network device, a first feature table entry of a first feature table, where the first feature table entry comprises a first prefix and a first action to take for a first feature; obtaining, by the network device table manager, a second feature table entry of a second feature table, where the second feature table entry comprises a second prefix and a second action to take for a second feature; making a first determination that the first prefix and the second prefix include a common portion and that the common portion is an entirety of each of the first and second prefixes; and in response to the first determination, adding a combined feature table entry to a combined feature table.

20 Claims, 7 Drawing Sheets

(51) Int. Cl.
    *G06F 16/23*         (2019.01)
    *H04L 41/12*         (2022.01)

(56) References Cited

U.S. PATENT DOCUMENTS

| | | | |
|---|---|---|---|
| 11,140,078 B1* | 10/2021 | Gangam | H04L 45/748 |
| 2008/0320119 A1* | 12/2008 | Achan | H04L 29/12783 |
| | | | 709/222 |
| 2018/0225589 A1* | 8/2018 | Ghavamzadeh | G06Q 30/0241 |
| 2018/0241671 A1* | 8/2018 | Bosch | H04L 67/327 |

\* cited by examiner

| Security Feature Entry Set 400 ||
|---|---|
| Source IP Address Prefix | Transform |
| 10.10.0.0/16 | 101 |
| 10.20.0.0/16 | 110 |
| 10.0.0.0/8 | 100 |

FIG. 4

| Mirroring Feature Entry Set 500 ||
|---|---|
| Source IP Address Prefix | Transform |
| 10.10.2.0/24 | 11 |
| 10.0.0.0/8 | 10 |

FIG. 5

| Combined Feature Table 600 | | |
|---|---|---|
| Source IP Address Prefix | Security Transform | Mirroring Transform |
| 10.10.2.0/24 | 101 | 11 |
| 10.10.0.0/16 | 101 | 10 |
| 10.20.0.0/16 | 110 | 10 |
| 10.0.0.0/8 | 100 | 10 |

FIG. 6

| Updated Mirroring Feature Entry Set 700 ||
|---|---|
| Source IP Address Prefix | Transform |
| 10.20.1.0/24 | 111 |
| 10.0.0.0/8 | 110 |
| 20.0.0.0/8 | 100 |

FIG. 7

| Updated Combined Feature Table 800 | | |
|---|---|---|
| Source IP Address Prefix | Security Transform | Mirroring Transform |
| 10.20.1.0/24 | 110 | 111 |
| 10.10.0.0/16 | 101 | 110 |
| 10.20.0.0/16 | 110 | 110 |
| 10.0.0.0/8 | 100 | 110 |
| 20.0.0.0/8 | 000 | 100 |

FIG. 8

MULTI-RESULT LOOKUPS

CROSS-REFERENCE TO RELATED APPLICATIONS

This application is a Continuation of U.S. patent application Ser. No. 16/377,151 filed Apr. 5, 2019, the entire contents of which are incorporated herein by reference.

BACKGROUND

Networks of interconnected devices (e.g., computer networks) often include any number of network devices. Such network devices may include any number of network chips and/or other devices/components that include tables implemented in hardware (i.e., hardware tables). Such hardware tables may be used, at least in part, to implement various features of a network device. Using a single table for each feature may require additional hardware in which to implement the tables, choosing not to implement some features, and/or being forced to choose one feature at the expense of another feature

SUMMARY

In general, in one aspect, embodiments described herein relate to a method for network hardware table management. In one or more embodiments, the method includes obtaining, by a network device table manager of a network device, a first feature table entry published by a first feature; obtaining, by the network device table manager, a second feature table entry published by a second feature; making a first determination that the first feature table entry and the second table feature entry each comprise a common prefix; and based on the first determination, adding a first combined feature table entry to a combined feature table, the first combined feature table entry comprising the common prefix, a first feature action of the first feature table entry and a second feature action of the second feature table entry.

In general, in one aspect, embodiments described herein relate to a non-transitory computer readable medium that includes instructions which, when executed by a processor, perform a method for network hardware table management. In one or more embodiments, the method includes obtaining, by a network device table manager of a network device, a first feature table entry published by a first feature; obtaining, by the network device table manager, a second feature table entry published by a second feature; making a first determination that the first feature table entry and the second table feature entry each comprise a common prefix; and based on the first determination, adding a first combined feature table entry to a combined feature table, the first combined feature table entry comprising the common prefix, a first feature action of the first feature table entry and a second feature action of the second feature table entry.

Other aspects of embodiments described herein will be apparent from the following description and the appended claims.

BRIEF DESCRIPTION OF DRAWINGS

FIGS. 4-8 show an example in accordance with one or more embodiments described herein.

DETAILED DESCRIPTION

Figure 1:
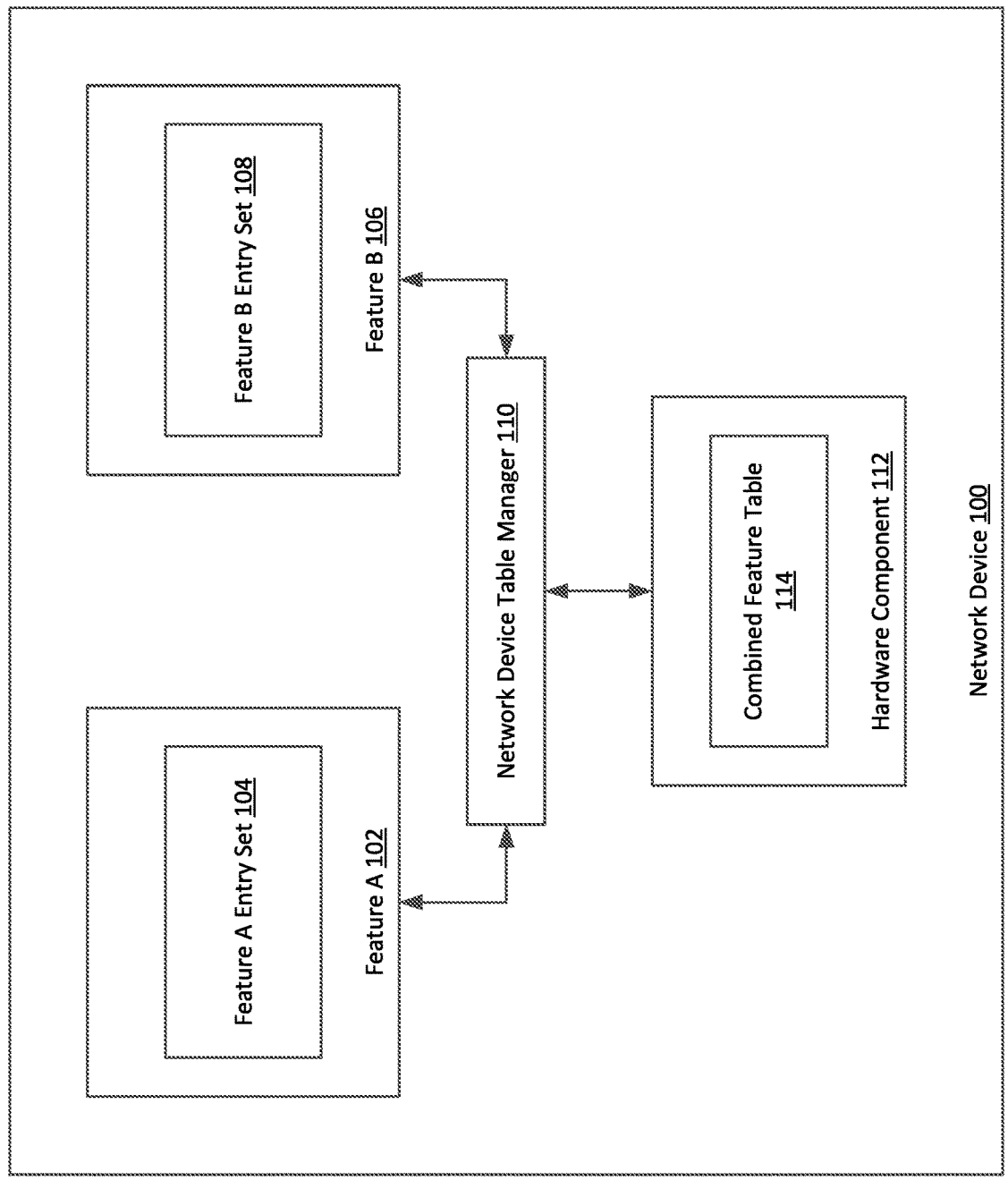
FIG. 1 shows a system in accordance with one or more embodiments described herein.

Specific embodiments will now be described with reference to the accompanying figures. In the following description, numerous details are set forth as examples of embodiments. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection.

In general, embodiments described herein relate to systems and methods for creating and updating combined feature tables to be programmed into hardware tables. Specifically, in one or more embodiments, features, such as security features, mirroring features, routing features, etc., publish feature entry sets to be programmed into hardware and used during longest prefix match (LPM) lookups to determine, at least in part, what action of the feature to perform for a given prefix. However, network devices only have limited hardware resources in which to implement such tables. Therefore, in one or more embodiments, feature entry sets for two or more features are combined into a single combined feature table. As is described below, such embodiments may save table space and/or reduce the number of table lookups that need to be performed to implement the two or more features.

FIG. 1 shows a network device in accordance with one or more embodiments described herein. As shown in FIG. 1, the network device (100) includes a feature A (102) with a feature A entry set (104), a feature B (106) with a feature B entry set (108), a network device table manager (110), and a hardware component (112) storing a combined feature table. Each of these components is described below.

In one or more embodiments, a network device (100) is any device of any type included in a network (not shown, described below). In one or more embodiments, a network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (which may also be referred to as a port). Examples of a network device (100) include, but are not limited to, a network switch, a router, a multilayer switch, a fibre channel device, an InfiniBand® device, etc. A network device (100) is not limited to the aforementioned specific examples.

In one or more embodiments, a network device (100) includes functionality to receive network traffic data units (e.g., frames, packets, tunneling protocol frames, etc.) at any of the physical network interfaces (i.e., ports) of the network device (100) and to process the network traffic data units. In one or more embodiments, processing a network traffic data unit includes, but is not limited to, a series of LPM lookups and corresponding actions, which may be referred to as a pipeline. Examples of pipeline processing include performing an LPM lookup to determine: (i) whether to take a security action (e.g., drop the network traffic data unit); (ii) whether to mirror the network traffic data unit; and/or (iii) determine how to route the network traffic data unit in order to transmit the network traffic data unit, from a network interface of the network device (100). A pipeline may be defined, for example, using a programming language such as the P4 programming language.

In one or more embodiments, a network device also includes and/or is operatively connected to any device storage (not shown) and/or device memory (not shown) (i.e., non-transitory computer readable mediums) storing any software and/or firmware.

Such software and/or firmware may include instructions which, when executed by the one or more processors (not shown) of a network device (100), cause the one or more processors to perform operations in accordance with one or more embodiments described herein.

The software instructions may be in the form of computer readable program code to perform embodiments may be stored, in whole or in part, temporarily or permanently, on a non-transitory computer readable medium such as a CD, DVD, storage device, a diskette, a tape, flash memory, physical memory, or any other non-transitory computer readable medium.

Specifically, the software instructions may correspond to computer readable program code that when executed by a processor(s), is configured to perform functionality related to embodiments described herein.

In one or more embodiments, the network device (100) is part of a network (not shown). A network may be an entire network or any portion thereof (e.g., a logical portion of network devices within the network topology, external to the network topology, etc.). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (100) that facilitate network connectivity for one or more operatively connected devices (e.g., computing devices, data storage devices, other network devices, etc.). In one or more embodiments, the network device (100) and other devices within the network (not shown) are arranged in a network topology. In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.), a virtual machine, and/or any other type of computing device with the aforementioned requirements.

In one or more embodiments, the network device (100) includes any number of hardware components (e.g., network chips, field programmable gate arrays (FPGAs), etc.), such as hardware component (112). In one or more embodiments, a hardware component (112) is any hardware (e.g., circuitry such as, for example, application specific integrated circuits (ASICs)), which may include software and/or firmware, that includes functionality related to receiving, processing, and/or transmitting network traffic data units in accordance with one or more embodiments described herein.

In order to perform such functionality, a hardware component (112) may include any number of sub-components (not shown). Such subcomponents may include, but are not limited to, one or more processors, one or more buffers (e.g., for implementing receive and/or transmit queues, such as virtual output queues (VOQs)), any type or amount of storage for storing hardware tables (e.g., combined feature table (114)). Such tables may control, at least in part, various aspects of the operation of a network device (100), such as functionality related to network traffic data unit processing/forwarding. Examples of such storage for hardware tables may include, but are not limited to, tertiary content addressable memory (TCAM) and static random access memory (SRAM). A hardware component (112) may also include and/or be operatively connected to any number of physical network interfaces of a network device (100). Such interfaces may provide a path external to the network device (e.g., to other devices), and/or may be operatively connected to other components internal to the network device (104), and each such interface may be an ingress and/or egress interface.

As a non-limiting example, a hardware component may be and/or include an ASIC that receives network traffic data units at an ingress port, and, so long as no policy (e.g., a security policy) indicates the network traffic data units should be dropped, determines out of which egress port on the network device (100) to forward the network traffic data units such as, for example, media access control (MAC) frames that include Internet Protocol (IP) packets.

In one or more embodiments, a network device (100) implements any number of features, such as those shown in FIG. 1 (feature A (102), feature B (106)). In one or more embodiments, a feature is a set of functionality that the network device is capable of performing, and that is implemented using hardware (e.g., circuitry) and/or combination of hardware and software that includes functionality to perform one or more aspects of embodiments described herein.

As discussed above and below, examples of features that may be implemented on a network device include, but are not limited to, security features (e.g., access control lists), packet mirroring features (e.g., generating copies of certain packets to be sent to destinations other than that indicated by a destination address of the packet), routing features (e.g., receiving packets and, based on one or more destination addresses therein, determining how to route a packet to the next step on the journey to the packet's destination), etc. For example, as described below, a feature, such as a security feature, may be implemented on a network device by a process. In one or more embodiments, a process is an instance of software that is being executed. In one or more embodiments, a process may execute within an operating system environment to perform instructions of the software that implements the feature. In one or more embodiments, execution of a process implementing a feature may be performed, at least in part, using one or more processors (not shown) of a network device (100).

In one or more embodiments, one type of functionality that may be performed by a feature includes, but is not limited to, publishing feature entry sets (e.g., feature A entry set (104), feature B entry set (108)) (described below).

In one or more embodiments, a feature entry set (104, 108) is a set of entries that include one or more network prefixes (not shown) and corresponding actions (not shown). In one or more embodiments, a network prefix is an aggregation of Internet Protocol (IP) addresses and a subnet mask. As an example, a network prefix may relate to the IPv4 or IPv6 protocol. If the prefix relates to IPv4 protocol, it will include a 32 bit number. An example of such a number represented in decimal form may be 10.10.0.0/16. The 16 indicates that the first 16 bits of the prefix define the aggregation of IP addresses represented, while the remaining 16 bits may be used to identify individual devices, define subnetworks, etc.

In one or more embodiments, an action is any data represented in any way that is associated with a prefix. For example, an action may be a shorter binary number (e.g., 3 bits) that can be used in an additional lookup to determine an action to take for a given feature, which may be referred to as a transform. As another example, an action may be a set of numbers that relate to routing a network traffic data unit. Other examples of actions include, but are not limited to, dropping a network traffic data unit, allowing propagation of a network traffic data unit, performing a logging action related to a network traffic data unit, setting a next hop index related to a network traffic data unit, and/or any combination of such actions. An action is not limited to the foregoing examples.

In one or more embodiments, prefixes in a feature set may be used to perform a LPM lookup. In one or more embodiments, a LPM lookup includes looking within a set of prefixes to determine the longest prefix that matches an initial portion of an IP address (e.g., source IP address, destination IP address, etc.) of a network traffic data unit. For example, if a set of prefixes includes 10.10.0.0/16 and 10.0.0.0/8, and a network traffic data unit is received that includes a destination IP address of 10.10.35.68, 10.10.0.0/16 is the longest prefix match, because the first 16 bits match instead of only the first 8 bits. Accordingly, an LPM lookup in a table with such prefixes would return an action associated with 10.10.0.0/16 rather than 10.0.0.0/8. Similarly, if, for example a prefix of 10.10.10.0/24 was looked up, an LPM lookup would return an action associated with 10.10.0.0/16 rather than 10.0.0.0/8. One having ordinary skill in the art, and the benefit of this Detailed Description, will appreciate that though embodiments disclosed herein are described in the context of using IP addresses to perform LPM lookups, other types of addresses or combinations of address types may alternately be used. Examples of such other addresses include, but are not limited to, a virtual routing and forwarding identifier (VRF-id) plus IP addresses, higher network stack layer port information, etc.

In one or more embodiments, a feature (102, 106) publishes feature entry sets (104, 108) in any suitable manner. In one or more embodiments, publishing means one entity making information available to another entity. In one or more embodiments, making information available to another entity involves storing the information in a form understandable by the intended receiving entity, and in a location accessible by the intended receiving entity. In one or more embodiments of the invention, it may be referred to as publication when an instance of executing software, such as a feature (102, 104), stores or makes available information intended for another entity in a device, such as a network device table manager (110). For example, a feature (102, 104) may generate a table of information (e.g., a feature entry set), and store the table in shared memory that is accessible to both the feature (102, 104) and a network device table manager (110). As another example, a feature being implemented as a process may share information, such as a table, with the network device table manager via inter-process communication In one or more embodiments, a network device (100) includes a network device table manager (110). In one or more embodiments, a network device table manager (110) is hardware (e.g., circuitry) and/or combination of hardware and software that includes functionality including, but not limited to, obtaining feature sets (104, 108) published by features (102, 104) and processing the feature sets to generate one or more combined feature tables. In one or more embodiments, a network device table manager (110) also includes functionality to program sub-components of hardware components (e.g., hardware component (112)). In one or more embodiments, a network device table manager is operatively connected to any number of features (e.g., feature A (102), feature B (106)) and to any number of hardware components (e.g., hardware component (112)).

In one or more embodiments, the combined feature table (114) is a table generated by the network device table manager (110) using the feature entry sets (104, 108) and programmed into storage of a hardware component (112).

While FIG. 1 shows a configuration of components, other configurations may be used without departing from the scope embodiments described herein. For example, there may be any number of features that publish any number of feature sets. As another example, there may be any number of network device table managers. As another example, any network device table manager may be operatively connected to any number of features, or any subset of features. As another example, there may be any number of hardware components. Accordingly, embodiments disclosed herein should not be limited to the configuration of components shown in FIG. 1.

Figure 2:
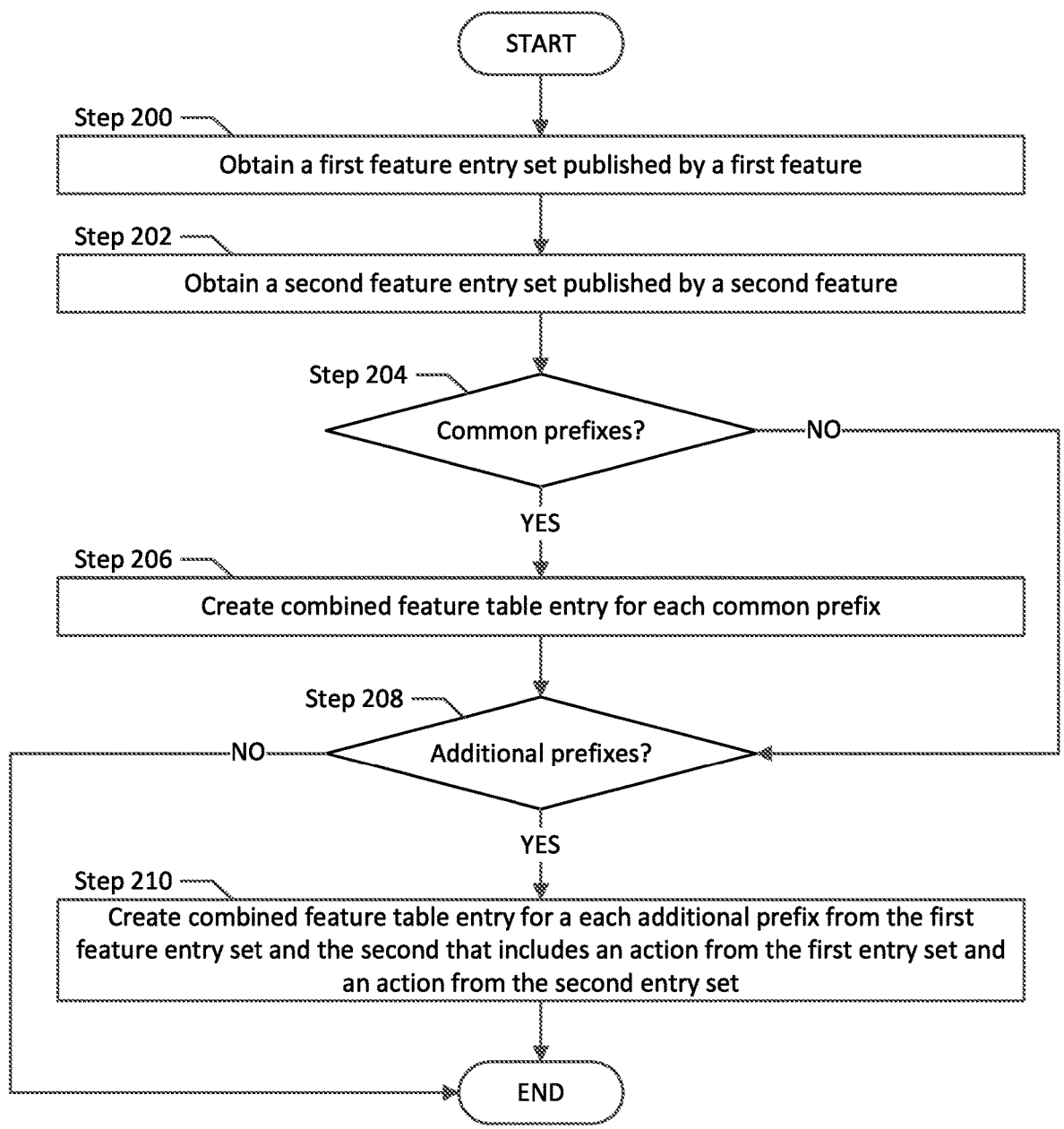
FIG. 2 shows a flowchart in accordance with one or more embodiments described herein.

FIG. 2 shows a flowchart describing a method for creating a combined feature table in accordance with one or more embodiments disclosed herein.

While the various steps in this flowchart are presented and described sequentially, one of ordinary skill in the relevant art will appreciate that some or all of the steps may be executed in different orders, may be combined or omitted, and some or all of the steps may be executed in parallel.

In Step 200, a first feature entry set is obtained. In one or more embodiments, the first feature entry set is obtained by a network device table manager. In one or more embodiments, the first feature entry set is published by a first feature. For example, the first feature may publish the first feature entry set in a table format stored in shared memory that is also accessible by the network device table manager. In one or more embodiments, the first feature entry set includes a set of prefixes, each associated with one of a set of first feature actions.

In Step 202, a second feature entry set is obtained. In one or more embodiments, the second feature entry set is obtained by a network device table manager. In one or more embodiments, the second feature entry set is published by a second feature. For example, the second feature may publish the second feature entry by sharing the second feature entry set with the network device table manager using inter-process communication. In one or more embodiments, the second feature entry set includes a set of prefixes, each associated with one of a set of second feature actions.

In Step 204, a determination is made as to whether any prefixes in the first feature entry set and the second feature entry set are common prefixes (i.e., the same prefix is included in an entry in both entry sets). In one or more embodiments, the determination is made by comparing each prefix in the first feature entry set with each prefix in the second feature entry set to discover any matching prefixes. In one or more embodiments, if one or more common prefixes are discovered, the method proceeds to Step 206. If, on the other hand, no common prefixes are discovered, the method proceeds to Step 208.

In Step 206, a combined feature table entry is created for each common prefix. In one or more embodiments, a combined feature table entry is created using the first feature entry set and the second feature entry set. In one or more embodiments, a combined feature table entry for a common prefix includes the common prefix, an action for the prefix from the first feature entry set, and another action for the prefix from the second feature entry set. In one or more embodiments, creating an entry for a common prefix reduces the number of entries in the combined feature table, because one entry covers all entries with the common prefix found in the various feature entry sets.

In one or more embodiments, the creation of a combined feature table entry, as discussed above in the description of Step 206, or below in the description of Step 210, is performed by analyzing the set of prefixes in the feature entry sets of various features to discover if any common prefixes exist and, if so, creating a combined table entry for the common prefix that includes the actions associated with the common prefix from each relevant feature. In one or more embodiments, each feature returns an action for a given prefix has that action associated with the prefix included in a combined feature table entry. In one or more embodiments, if a feature does return an action for a given prefix (which would not occur when a common prefix is found, as in Step 204, but may occur for additional prefixes found, as in Step 208, discussed below), a null value (e.g., a number of binary zeros) may be assigned to the prefix for the feature. In one or more embodiments, a null value is any item of information that conveys that no action (i.e., a null action) exists for a given prefix from a given feature. One having ordinary skill in the art, and the benefit of this Detailed Description, will appreciate that there may be any number of features, and thus any number of actions associated with a given prefix, and that at least a portion of the features may have more than one action associated with a given prefix.

As a non-limiting example, generation of a combined feature table entry may include using the first feature entry set and the second feature entry set to construct a trie. The nodes of the trie may be a set of prefixes that includes all prefixes in the first feature entry set and the second feature entry set. The trie may then be walked, with each node/prefix being assigned actions corresponding to what each feature would return for a given prefix.

In Step 208, after either determining that there are no common prefixes in the first feature entry set and second feature entry set, or creating entries for each common prefix in a combined feature table, a determination is made whether there are any additional prefixes in the first feature entry set or the second feature entry set. In one or more embodiments, if there are no additional prefixes in either set, the method ends. If, on the other hand, there are additional entries in either set, the method proceeds to Step 210.

In Step 210, a combined feature table entry is generated (as described above) for each additional prefix discovered in Step 208. In one or more embodiments, the combined feature table entries each include one of the additional prefixes, and an action for the prefix returned from the first feature entry set and the second feature entry set (or a null value if no action is returned for a given prefix for a given feature). In one or more embodiments, the prefix returned by a feature is the longest matching prefix from the feature entry set, or null action if prefix matches no entries in the feature set Once the combined feature table is generated, although not shown in FIG. 2, the combined feature table may be programmed into storage of a hardware component of a network device. Such a programmed table may then be used to implement a set of features. For example, when a network traffic data unit is received by a network device, a destination IP address in the network traffic data unit and the combined feature table may be used to perform a LPM lookup. Once the LPM is identified, each action associated with the prefix may also be identified with the single lookup, leading to actions for each feature, or any portion of features.

In one or more embodiments, although not shown in FIG. 2, a conflict resolution process may exist for resolving conflicts between actions stored in a combined feature table for various features. In one or more embodiments, a conflict exists when a combined feature table entry includes actions that are counter to one another. In one or more embodiments, conflict resolution is performed prior to programming the combined feature table entry into a hardware table. In one or more embodiments, conflicts are resolved by determining which actions of a set of conflicting actions has been assigned the highest precedence among the actions, and performing that action while not performing the conflicting actions with a lower precedence. For example, if one feature indicates that a packet within a network traffic data unit having a certain network prefix as part of a destination address should be dropped, and another feature indicates that the packet should be forwarded, a conflict resolver may be configured to determine which action should take precedence, and allow the performance of the action having such precedence.

Figure 3:
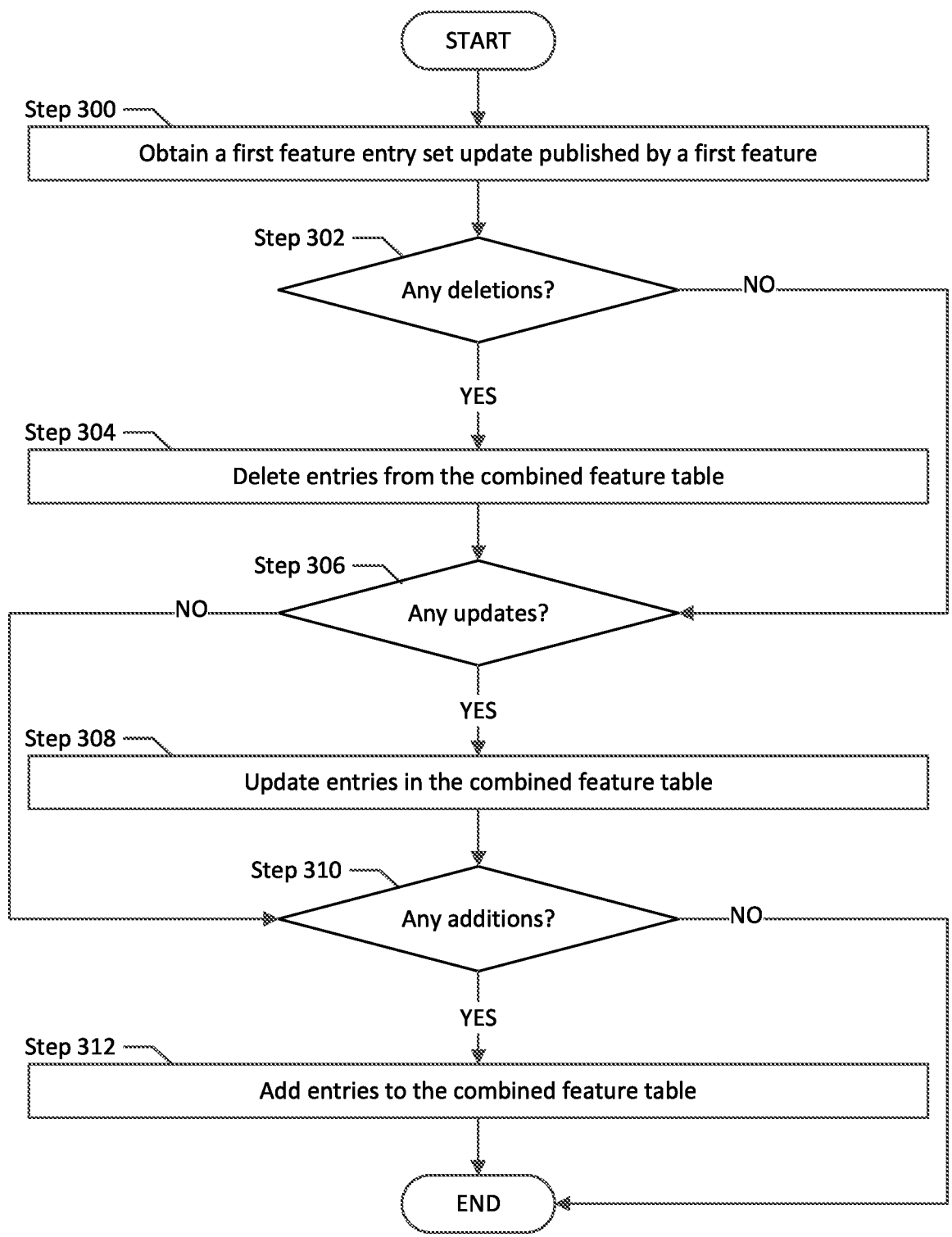
FIG. 3 shows a flowchart in accordance with one or more embodiments described herein.

FIG. 3 shows a flowchart describing a method for updating a combined feature table in accordance with one or more embodiments disclosed herein.

While the various steps in this flowchart are presented and described sequentially, one of ordinary skill in the relevant art will appreciate that some or all of the steps may be executed in different orders, may be combined or omitted, and some or all of the steps may be executed in parallel.

In Step 300, an updated first feature entry set is obtained. In one or more embodiments, the updated first feature entry set is published by the first feature and obtained by the network device table manager. In one or more embodiments, the updated first feature entry set includes changes from the first feature entry set. In one or more embodiments, such changes may include, but are not limited to: different actions being associated with certain prefixes that were present in the first feature entry set; additional prefixes that were not present in the first feature entry set, with such additional prefixes being associated with an action; and/or deletions of one or more prefixes from the first feature entry set, along with the action associated with the deleted one or more prefixes.

In Step 302, a determination is made whether the updated first feature entry set has any deletions. In one or more embodiments, as discussed above, a deletion occurs when an entry with a prefix and associated action that were included in the first feature entry set are not included in the updated first feature entry set. In one or more embodiments, if there are any deletions, the method proceeds to Step 304. If, on the other hand, there are no deletions, the method proceeds to Step 306.

In Step 304, any entries in the combined feature table that do not include a common prefix found in other feature entry sets but that do include a prefix deleted in the updated first feature entry set are deleted from the combined feature table. In one or more embodiments, the deletions are made by a network device table manager. In one or more embodiments, any deletions are made via a process of generating a new trie using the updated first feature entry set and all other feature entry sets, calculating the difference between the previous trie and the new trie, and using the differences create a set of one or more actions to delete entries from the combined feature table. In one or more embodiments, the deletions occur before any updates or additions in order to create space in the hardware table in which the combined feature table is implemented, as such tables may have limited space.

In one or more embodiments, a deletion does not impact the implementation of other features, because a shorter prefix exists within the combined feature table that matches IP addresses of received network traffic data units and/or the same prefix exists in a feature set and the action for the other feature associated with the prefix is not changed during the deletion process. In one or more embodiments of the invention, if the prefix that is deleted from one feature entry set is deleted, but the prefix exists in another feature entry set, then an action returned by the feature set for the prefix (which may be the longest matching prefix), or a null value is entered for that prefix for the feature for which the prefix was deleted if no action is returned by the feature set for that prefix and there is no shorter covering prefix in the updated entry set.

In Step 306, a determination is made whether the updated first feature entry set has any updates. In one or more embodiments, as discussed above, an update exists when an entry with a prefix that was included in the first feature entry set is associated with a different action in the updated first feature entry set. In one or more embodiments, if there are any updates, the method proceeds to Step 308. If, on the other hand, there are no updates, the method proceeds to Step 310.

In Step 308, any entries in the combined feature table that include a prefix associated with an updated action have the action for the first feature updated in the combined feature table. In one or more embodiments, the updates are made by a network device table manager. In one or more embodiments, any updates are made via a process of generating a new trie using the updated first feature entry set and all other feature entry sets, calculating the difference between the previous trie and the new trie, and using the differences create a set of one or more actions to update entries from the combined feature table. In one or more embodiments, an update does not impact the implementation of other features, because an entry still exists within the combined feature table for all other features that prefix-matches IP addresses of received network traffic data units.

In Step 310, a determination is made whether the updated first feature entry set has any additions. In one or more embodiments, as discussed above, an addition exists when an entry with a prefix that was not included in the first feature entry set is included in the updated first feature entry set with an associated action. In one or more embodiments, if there are any additions, the method proceeds to Step 312. If, on the other hand, there are no additions, the method ends.

In Step 312, any additional entries are added as new entries to the combined feature table that include the new prefix, the action associated with the new prefix in the updated first feature entry set, and actions for other features that are obtained by finding the longest prefix match from among the entries of other feature entry sets or null action if no action is returned. In one or more embodiments, the additions are made by a network device table manager. In one or more embodiments, any additions are made via a process of generating a new trie using the updated first feature entry set and all other feature entry sets, calculating the difference between the previous trie and the new trie, and using the differences create a set of one or more actions to add entries from the combined feature table. In one or more embodiments, an addition does not impact the implementation of other features, because other features did not have a feature entry set that used the specific prefix being added.

In one or more embodiments, although not shown in FIG. 3, once the combined feature table has been updated with all deletions, then updates and additions, the updated combined feature table is programmed into storage of a hardware component of a network device. Although FIG. 3 shows updates happening prior to additions, one having ordinary skill in the art, and the benefit of this Detailed Description, will appreciate that, in one or more embodiments, additions may occur prior to updates, or that additions and updates may alternate in some manner, or that updates may occur before deletions, but that deletions occur before additions.

FIGS. 4-8 show an example in accordance with one or more embodiments described herein. The following example is for explanatory purposes only and not intended to limit the scope of embodiments described herein.

Referring to FIG. 4, consider a scenario in which a security feature (e.g., an access control list (ACL)) publishes a security feature entry set (400) that includes a set of source IP address prefixes and associated transforms. Specifically, as shown in FIG. 4, the source IP address prefix 10.10.0.0/16 is associated with the transform 101, the source IP address prefix 10.20.0.0/16 is associated with the transform 110, and the source IP address prefix 10.0.0.0/8 is associated with the transform 100. In one or more embodiments, the association of the source IP address prefixes with the transforms allows the 32 bit IP address to be transformed into a three bit number. Such a transformation may be used, for example, to perform easier and faster lookups in other tables to determine a security action to perform (e.g., drop packet, allow packet, quarantine a device from which a packet is received, etc.).

Additionally, as shown in FIG. 5, a mirroring feature (e.g., for mirroring certain packets) publishes a mirroring feature entry set (500) that includes a set of source IP address prefixes and associated transforms. Specifically, as shown in FIG. 5, the source IP address prefix 10.10.2.0/24 is associated with the transform 11, and the source IP address prefix 10.0.0.0/8 is associated with the transform 10. In one or more embodiments, the association of the source IP address prefixes with the transforms allows the 32 bit IP address to be transformed into a two bit number. Such a transformation may be used, for example, to perform easier and faster lookups in other tables to determine a mirroring action to perform.

FIG. 6 shows a combined feature table (600). In one or more embodiments, the combined feature table is made using the security feature entry set (400) and the mirroring entry feature set (500).

As shown in FIG. 6, the first entry includes the source IP address prefix 10.10.2.0/24, which was a prefix in the mirroring feature entry set (500). Accordingly, the first entry includes the mirroring transform 11 that was associated with 10.10.2.0/24 in the mirroring feature entry set. Additionally, the first entry includes the security transform 101 because the longest prefix match in the security feature entry set (400) for 10.10.2.0/24 is 10.10.0.0/16, which is associated with the transform 101 in the security feature entry set (400).

The second entry includes the source IP address prefix 10.10.0.0/16, which was a prefix in the security feature entry set (400). Accordingly, the second entry includes the security transform 101 that was associated with 10.10.0.0/16 in the security feature entry set. Additionally, the second entry includes the mirroring transform 10 because the longest prefix match in the security feature entry set for 10.10.0.0/16 is 10.0.0.0/8, which is associated with the transform 10 in the mirroring feature entry set (500).

The third entry includes the source IP address prefix 10.20.0.0/16, which was a prefix in the security feature entry set (400). Accordingly, the third entry includes the security transform 110 that was associated with 10.20.0.0/16 in the security feature entry set. Additionally, the third entry includes the mirroring transform 10 because the longest prefix match in the security feature entry set for 10.20.0.0/16 is 10.0.0.0/8, which is associated with the transform 10 in the mirroring feature entry set (500).

The fourth entry includes the source IP address prefix 10.0.0.0/8, which was a common prefix in the security feature entry set (400) and in the mirroring feature entry set. Accordingly, the fourth entry includes the security transform 100 that was associated with 10.0.0.0/8 in the security feature entry set. Additionally, the first entry includes the mirroring transform 10 that was associated with 10.0.0.0/8 in the mirroring feature entry set (500).

In one or more embodiments, the source address IP prefixes included in the combined feature table are organized from longest prefix to shortest prefix. In one or more embodiments, once the combined feature table has been generated, it is programmed into a TCAM of a hardware component of a network device. In one or more embodiments, the inclusion of an entry with a common prefix allows for the combined feature table to include only four entries rather than five entries (i.e., the sum total of entries between the two feature sets).

In one or more embodiments, a network traffic data unit is received with a source IP address of 10.10.72.27. As part of processing the network traffic data unit, a LPM lookup is performed using the source IP address of the network traffic data unit and the programmed TCAM that includes the combined feature table. The LPM lookup yields the second entry, which includes the longest matching prefix. Accordingly, the lookup yields a security transform of 101, which is used to lookup a security action. The second lookup yields an action of allowing the network traffic data unit. The LPM lookup also yields a mirroring transform of 10, which is used to lookup a mirroring action. The second lookup yields an action of mirroring the network traffic data unit out of a mirroring interface of the network device.

Continuing the example, FIG. 7 shows an updated mirroring feature entry set (700). As shown in FIG. 7, the mirroring feature (e.g., for mirroring certain packets) publishes an updated mirroring feature entry set (700) that includes a set of source IP address prefixes and associated transforms. Specifically, as shown in FIG. 7, the source IP address prefix 10.20.1.0/24 is associated with the transform 111, the source IP address prefix 10.0.0.0/8 is associated with the transform 110, and the source IP address prefix 20.0.0.0/8 is associated with the transform 100. In one or more embodiments, the association of the source IP address prefixes with the transforms allows the 32 bit IP address to be transformed into a three bit number. Such a transformation may be used, for example, to perform easier and faster lookups in other tables to determine a mirroring action to perform.

Using the updated mirroring feature entry set, the network device table manager constructs a new trie and compares the new trie with the trie created using the original security feature entry set (400) and the original mirroring feature entry set (500) to ascertain the differences between the two tries.

Next, the network device table manager first determines that the prefix 10.10.2.0/24 has been deleted from the mirroring feature entry set (400) by not being included in the updated mirroring feature entry set (700). Accordingly, the network device table manager generates an action that causes the deletion of the entry for the prefix 10.10.2.0/24 from the combined feature table.

In one or more embodiments, though not shown in the example tables of FIGS. 4-8, if there is a deletion of a common prefix from one feature, but the prefix is still present for another feature, then the combined table entry would be updated to include a null value for the feature for which the prefix was deleted instead of deleting the combined feature table entry entirely. Additionally, in one or more embodiments, if the prefix deleted from a first feature is a common prefix that still exists for other features, then other combined table entries may require updating the other entries to a new LPM from the first feature Next, the network device table manager determines that the entry in the updated mirroring feature entry set for the prefix 10.0.0.0/8 has been updated to be associated with a transform 110. Accordingly, the network device table manager generates an action that causes the entry in the combined feature table to be updated to include 110 as the mirroring transform associated with 10.0.0.0/8 instead of 10.

Next, the network device table manager determines that the updated mirroring feature entry set includes an additional prefix of 10.20.1.0/24, which is associated with a transform of 111 and was not present in the original mirroring feature entry set. Accordingly, the network device table manager generates and action that causes an entry to be added to the combined feature table for the prefix 10.20.1.0/24. The new entry includes the mirroring transform 111 because that is the transform associated with the prefix in the updated mirroring feature entry set. Additionally, the new entry includes the security transform 110 that was associated with 10.20.0.0/16 in the security feature entry set (500) because 10.20.0.0/16 is the LPM for 10.20.1.0/24.

Next, the network device table manager determines that the updated mirroring feature entry set includes an additional prefix of 20.0.0.0/8, which is associated with a transform of 100 and was not present in the original mirroring feature entry set. Accordingly, the network device table manager generates and action that causes an entry to be added to the combined feature table for the prefix 20.0.0.0/8. The new entry includes the mirroring transform 100 because that is the transform associated with the prefix in the updated mirroring feature entry set. Additionally, the new entry includes the security transform 000 because the security feature entry set does not include a prefix match for 20.0.0.0/8.

In one or more embodiments, once the deletion, update, and additions have been made, the resulting updated combined feature table (800) is shown in FIG. 8. The updated combined feature table (800) is then programmed into the TCAM.

In one or more embodiments, the deletions are programmed to hardware and then the additions are programmed to hardware. If additions are programmed to the hardware before deletions are programmed to the hardware, the table may transiently overflow even if the final table size is within table capacity.

Embodiments described herein may allow for more features of a network device to be implemented using less hardware resources. When pipelines to be implemented in programmable hardware tables, developers have to consider the resources available on the hardware on which the pipeline is being deployed (e.g., SRAM, TCAM, number of table lookups etc. are in finite supply). All features that are added to the pipeline have to contend for the same hardware resources, which may lead to trying to balance resource allocation between features. Sometimes this leads to unwanted compromises; features are reduced in scale or left out completely. Embodiments described herein may mitigate, at least in part, such issues.

While embodiments described herein have been described with respect to a limited number of embodiments, those skilled in the art, having benefit of this disclosure, will appreciate that other embodiments can be devised which do not depart from the scope of embodiments described herein as disclosed herein. Accordingly, the scope embodiments described herein should be limited only by the attached claims.

What is claimed is:

1. A method for network hardware table management, the method comprising:
obtaining, by a network device table manager of a network device, a first feature table entry of a first feature table, wherein the first feature table entry comprises a first prefix and a first action to take for a first feature;
obtaining, by the network device table manager, a second feature table entry of a second feature table, wherein the second feature table entry comprises a second prefix and a second action to take for a second feature;
making a first determination that the first prefix and the second prefix include a common portion and that the common portion is an entirety of each of the first and second prefixes; and
in response to the first determination, adding a combined feature table entry to a combined feature table, wherein the combined feature table entry comprises the first prefix and is associated with the first action and the second action.

2. The method of claim 1, further comprising:
obtaining, by the network device table manager, an additional first feature table entry comprising an additional first feature table entry prefix and an additional first action for the first feature;
obtaining, by the network device table manager, an additional second feature table entry comprising an additional second feature table entry prefix and an additional second action for the second feature;
making a second determination that the additional first feature table entry prefix is longer than the additional second feature table entry prefix;
making a third determination that an initial portion of the additional first feature table entry prefix matches all of the additional second feature table entry prefix; and
in response to the second determination and the third determination, adding an additional combined feature table entry to the combined feature table, the additional combined feature table entry comprising the additional first feature table entry prefix, the additional first action, and the additional second action.

3. The method of claim 2, wherein:
the first feature table entry and the additional first feature table entry are each part of a first feature entry set associated with the first feature, and
the second feature table entry and the additional second feature table entry are each part of a second feature entry set associated with the second feature.

4. The method of claim 3, further comprising:
obtaining, by the network device table manager, an updated second feature entry set comprising a first updated second feature table entry that comprises the common portion and an updated second action for the second feature;
making a fourth determination that the updated second action is different from the second action; and
in response to the fourth determination, updating the combined feature table entry to replace the second action with the updated second action.

5. The method of claim 1, further comprising:
receiving a network traffic data unit at the network device; and
in response to the common portion being an entirety of each of the first and second prefixes, obtaining the first action and the second action.

6. The method of claim 5, further comprising:
making a second determination, by a conflict resolver, that the first action and the second action are conflicting actions;
making a third determination that the first action has precedence over the second action; and in response to the third determination, programming, by the network device table manager, a network device hardware component table with the combined feature table to indicate that the first action has precedence over the second action.

7. The method of claim 1, wherein
the first action specifies a security action to be executed on a network traffic associated with the first prefix, and
the security action comprising at least one of dropping the network traffic, allowing the network traffic, and quarantining a network device from which the network traffic is transmitted.

8. The method of claim 1, wherein
the second action specifies a mirroring action to be executed the network traffic associated with the second prefix, and
the mirroring action comprises generating copies of the network traffic to be sent to destinations other than a predetermined destination indicated by a destination address of the network traffic.

9. A non-transitory computer readable medium comprising instructions that, when executed by a processor, perform a method for network hardware table management, the method comprising:
obtaining, by a network device table manager of a network device, a first feature table entry of a first feature table, wherein the first feature table entry comprises a first prefix and a first action to take for a first feature;
obtaining, by the network device table manager, a second feature table entry of a second feature table, wherein the second feature table entry comprises a second prefix and a second action to take for a second feature;
making a first determination that the first prefix and the second prefix include a common portion and that the common portion is an entirety of each of the first and second prefixes; and
in response to the first determination, adding a combined feature table entry to a combined feature table, wherein the combined feature table entry comprises the first prefix and is associated with the first action and the second action.

10. The non-transitory computer readable medium of claim 9, wherein the method performed by executing the instructions further comprises:
obtaining, by the network device table manager, an additional first feature table entry comprising an additional first feature table entry prefix and an additional first action for the first feature;
obtaining, by the network device table manager, an additional second feature table entry comprising an additional second feature table entry prefix and an additional second action for the second feature;
making a second determination that the additional first feature table entry prefix is longer than the additional second feature table entry prefix;
making a third determination that an initial portion of the additional first feature table entry prefix matches all of the additional second feature table entry prefix; and
in response to the second determination and the third determination, adding an additional combined feature table entry to the combined feature table, the additional combined feature table entry comprising the additional first feature table entry prefix, the additional first action, and the additional second action.

11. The non-transitory computer readable medium of claim 10, wherein:

the first feature table entry and the additional first feature table entry are each part of a first feature entry set associated with the first feature, and
the second feature table entry and the additional second feature table entry are each part of a second feature entry set associated with the second feature.

12. The non-transitory computer readable medium of claim 11, wherein the method performed by executing the instructions further comprises:
obtaining, by the network device table manager, an updated second feature entry set comprising a first updated second feature table entry that comprises the common portion and an updated second action for the second feature;
making a fourth determination that the updated second action is different from the second action; and
in response to the fourth determination, updating the combined feature table entry to replace the second action with the updated second action.

13. The non-transitory computer readable medium of claim 9, wherein the method performed by executing the instructions further comprises:
receiving a network traffic data unit at the network device; and
in response to the common portion being an entirety of each of the first and second prefixes, obtaining the first action and the second action.

14. The non-transitory computer readable medium of claim 13, wherein the method performed by executing the instructions further comprises:
making a second determination, by a conflict resolver, that the first action and the second action are conflicting actions;
making a third determination that the first action has precedence over the second action; and
in response to the third determination, programming, by the network device table manager, a network device hardware component table with the combined feature table to indicate that the first action has precedence over the second action.

15. The non-transitory computer readable medium of claim 9, wherein
the first action specifies a security action to be executed on a network traffic associated with the first prefix,
the security action comprising at least one of dropping the network traffic, allowing the network traffic, and quarantining a network device from which the network traffic is transmitted.

16. The non-transitory computer readable medium of claim 9, wherein
the second action specifies a mirroring action to be executed the network traffic associated with the second prefix,
the mirroring action comprises generating copies of the network traffic to be sent to destinations other than a predetermined destination indicated by a destination address of the network traffic.

17. A network device comprising:
a storage; and
a processor coupled to the storage,
wherein the processor is configured to:
obtain a first feature table entry of a first feature table, wherein the first feature table entry comprises a first prefix and a first action to take for a first feature;

obtain a second feature table entry of a second feature table, wherein the second feature table entry comprises a second prefix and a second action to take for a second feature;

make a first determination that the first prefix and the second prefix include a common portion and that the common portion is an entirety of each of the first and second prefixes; and in response to the first determination, add a combined feature table entry to a combined feature table, wherein the combined feature table entry comprises the first prefix and is associated with the first action and the second action.

18. The network device of claim 17, wherein the processor is further configured to:

obtain an additional first feature table entry comprising an additional first feature table entry prefix and an additional first action for the first feature;

obtain an additional second feature table entry comprising an additional second feature table entry prefix and an additional second action for the second feature;

make a second determination that the additional first feature table entry prefix is longer than the additional second feature table entry prefix;

make a third determination that an initial portion of the additional first feature table entry prefix matches all of the additional second feature table entry prefix; and in response to the second determination and the third determination, add an additional combined feature table entry to the combined feature table, the additional combined feature table entry comprising the additional first feature table entry prefix, the additional first action, and the additional second action.

19. The network device of claim 18, wherein:

the first feature table entry and the additional first feature table entry are each part of a first feature entry set associated with the first feature, and the second feature table entry and the additional second feature table entry are each part of a second feature entry set associated with the second feature.

20. The network device of claim 19, wherein the processor is further configured to:

obtain an updated second feature entry set comprising a first updated second feature table entry that comprises the common portion and an updated second action for the second feature;

make a fourth determination that the updated second action is different from the second action; and in response to the fourth determination, update the combined feature table entry to replace the second action with the updated second action.

* * * * *